United States Patent [19]

Warner et al.

[11] 3,928,839
[45] Dec. 23, 1975

[54] SONAR SYSTEM
[75] Inventors: Henry L. Warner; Ted I. Haney, both of Panama City, Fla.
[73] Assignee: The United States of America as represented by the Secretary of the Navy, Washington, D.C.
[22] Filed: Sept. 5, 1968
[21] Appl. No.: 757,628

[52] U.S. Cl. ................................ 340/3 R; 340/8 L
[51] Int. Cl.² .......................................... G01S 9/68
[58] Field of Search .................... 340/3, 3 A, 6, 8 L

[56] References Cited
UNITED STATES PATENTS

| | | | |
|---|---|---|---|
| 2,827,620 | 3/1958 | Batchelder | 340/6 |
| 3,381,264 | 4/1968 | Lavergne et al. | 340/3 |
| 3,389,372 | 6/1968 | Halliday et al. | 340/3 |

Primary Examiner—Richard A. Farley
Attorney, Agent, or Firm—Richard S. Sciascia; Don D. Doty; William T. Skeer

[57] ABSTRACT

An echo ranging system has a broad investigative beam pattern comprised of a plurality of adjacent narrow investigative beam patterns, each differing in frequency from the adjoining pattern. Said investigative beam pattern is formed by a plurality of individual, shaded, electro-acoustic transducers. Each of said transducers being electrically connected to separate individual electronic means. Plural circuit means drive groups comprised of nonadjacent ones of said transducers and connected electronic means at separate frequencies. A plurality of receiving channels are connected to each of said individual electronic means.

4 Claims, 12 Drawing Figures

Henry L. Warner
Ted I. Haney
INVENTORS

Henry L. Warner
Ted I. Haney
INVENTORS

Henry L. Warner
Ted I. Haney
INVENTORS

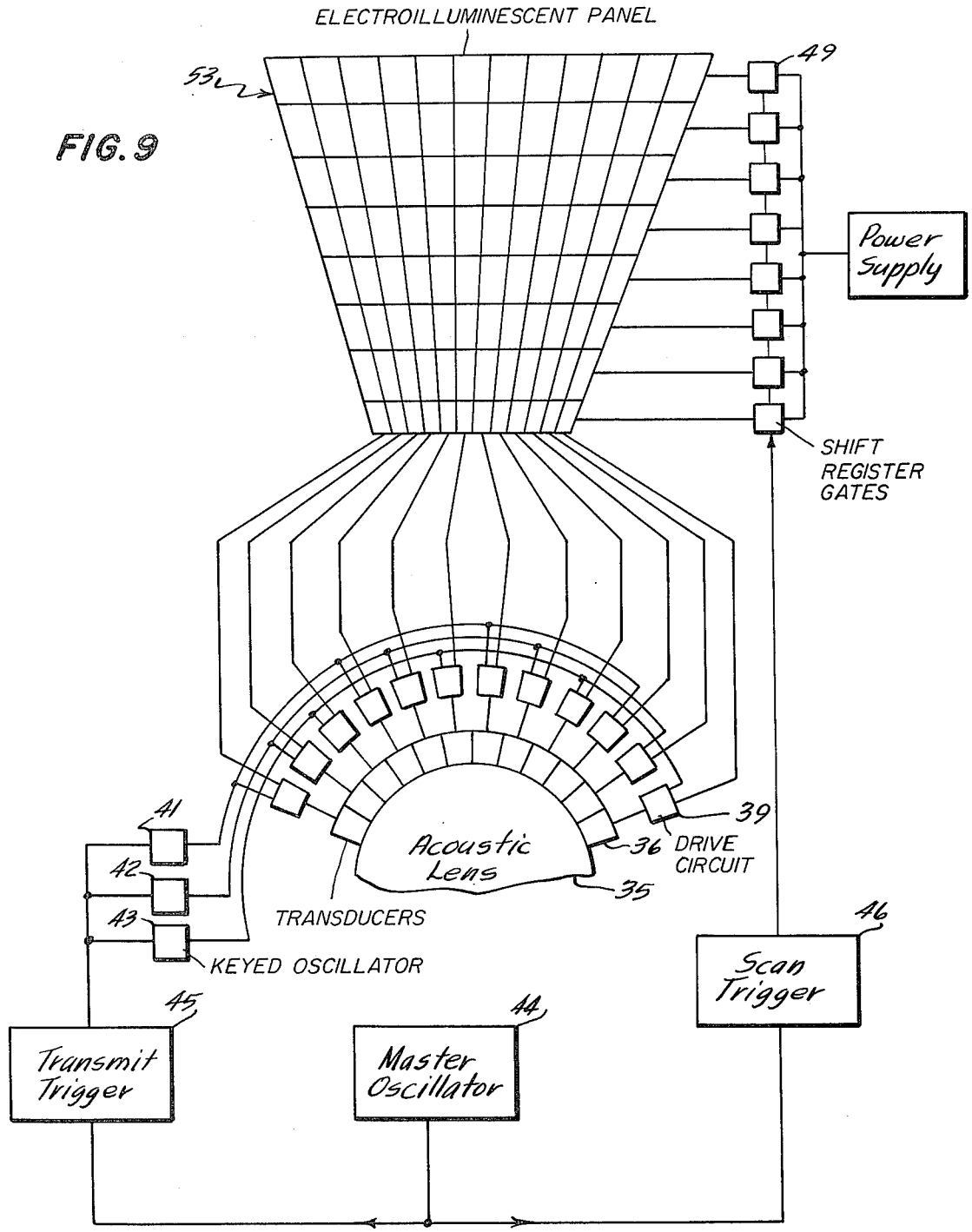

To Scan Trigger Circuits 46

To Driver Circuits 39

To CRT Video Amp. 52

Henry L. Warner
Ted I. Haney
INVENTORS

BY William T. Skeer
Agent
Don D. Doty
Attorney

SONAR SYSTEM

The invention described herein may be manufactured and used by or for the of the United States of America for governmental purposes without the payment of any royalties thereon or therefor. buried This invention pertains to an active type echo ranging system which employs compressional wave energy. In this presentation the system will be described as an active sonar for use in an aqueous medium, but it should be understood that, with certain obvious alteration or substitution of component parts, the invention may be practiced in other environments. For example, the invention may utilize ultrasonic compressional waves in the air to establish an echo detection and ranging system. In particular, the invention is herein disclosed as it pertains to a downward looking sonar system to investigate the bottom of a body of water for objects resting thereon as well as irregularities therein, and solid objects shallowly buried beneath the bottom. Again, it should be borne in mind that the invention has other applications than bottom and buried object sounding. As an example of another application of the basic system of this invention, the beam insonifying and receiving apparatus may be oriented to produce an investigative pattern in a horizontal plane. With this change in beam attitude, the device becomes effective to detect the presence of swimmers or small displacement swimmer delivery vehicles. Thus, the invention should be considered as having general applicablilty in the fields of oceanography, hydrography, and piscatology in addition to the specific use as a buried object sonar.

The known acoustic ranging devices have limited effectiveness in location of shallowly buried objects, as will be more clearly described herein. The most frequently encountered operationally satisfactory system sonifies a fan-shaped investigation area with a series of high energy acoustic pulses. Echo returns from the insonified area are received by either scanning the area with a directional transducer, or using a fixed transducer having the same directional response as the insonifying source of high energy acoustic pulses. Regardless of which reception alternative is chosen, the design of the known systems results in a device or system which is a compromise between several inherent parameters. These compromise designs, while optimizing the acoustic ranging device for buried object detection, have reduced the effectiveness in other areas.

With the above considerations in mind, it is an object of this invention to provide an acoustic ranging and detection system which is capable of locating objects shallowly buried beneath the bottom of the sea without diminishing its effectiveness as a general purpose acoustic detection and ranging system.

Another object of this invention is the provision of an acoustical detection and ranging system employing a high sensitivity transducer but having a minimum of noise and reverberation interference.

A further object of this invention is the provision of an acoustical detection and ranging system employing an acoustic lens to define a wide investigation area.

An additional object of this invention is the provision of a wide field of view sonar system with a high information rate.

Another object of this invention is the provision of an acoustic detection and ranging system with improved target resolution throughout a wide investigation area.

Another object of this invention is the provision of sonar detection and ranging system with an improved radiation pattern.

A still further object of this instant invention is the provision of an improved sonar detection and ranging system with an improved inertialess scanning arrangement.

Other objects and many of the attendant advantages will be readily appreciated as the subject invention becomes better understood by reference to the following detailed description, when considered in conjunction with the accompanying drawings wherein:

FIG. 9 is a block diagram of an alternative form of the invention;

Figure 1:
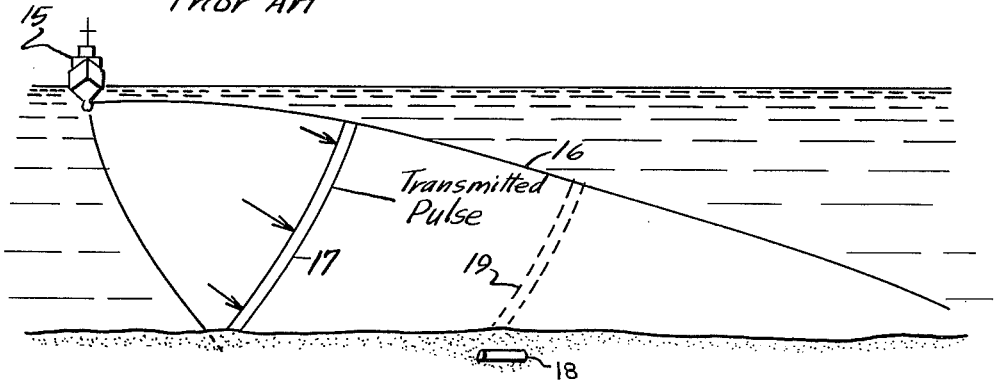
FIG. 1 is a view of a prior art sonar system in use.

Referring to FIG. 1, a ship 15 mounting a prior art sonar system insonifies an investigation area 16 with a series of acoustic pulses, one of which is shown in 17. As the acoustic pulse 17 radiates outwardly in the direction indicated by the arrows, the lower edge passes along the bottom and produces a continuous echo return therefrom. Objects encountered by acoustic beam 17 produce echo returns which are received at ship 15 along with the echo from the bottom. Buried object 18 is exemplary of the type of object desired to be detected and may be considered either salvage or marine ordinance. An echo return is reflected from buried object 18 at a time corresponding to the advancement of acoustic pulse 17 to a position 19. Because of the relationship of the investigation area and the ship 15, such systems are called "side looking sonars".

Figure 2:
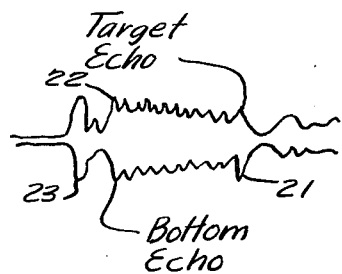
FIG. 2 is an illustration of the received signal associated with the device in FIG. 1.

As shown at FIG. 2, the target echo signal 21 returned by the system of FIG. 1 is not appreciably greater than the bottom echo signal 22. The initial signal return shown in FIG. 2 is a volume reverberation signal 23. This signal is caused by the acoustic reverberation of the small volume immediately adjacent the transducer when insonified by the high energy of the transmitted pulse. FIG. 2 is typical of the return signal of a side looking sonar.

Figure 3:
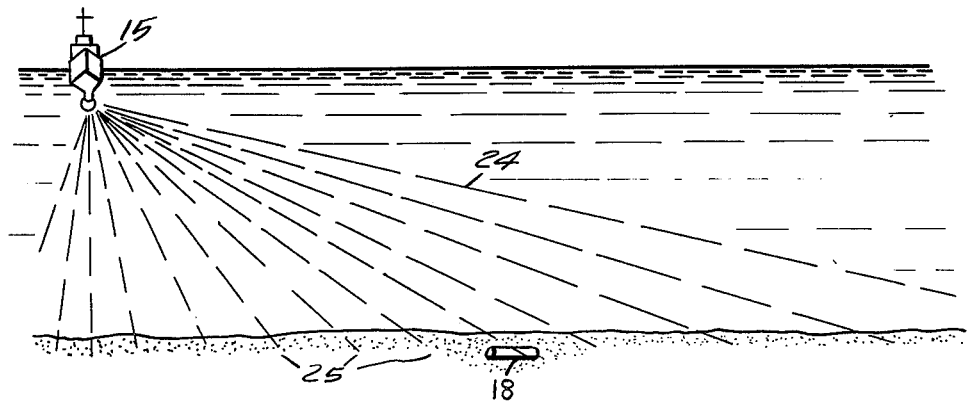
FIG. 3 is an illustration of the system of the present invention in use.

FIG. 3 illustrates the device of the present invention. An investigative search pattern 24 is seen to emerge from ship 15 and to be comprised by a plurality of pencil beams, shown by their center lines at 25. The advantage of a pencil beam configuration is shown in FIG. 4, which is a time-amplitude plot of a single pencil beam 25.

Figure 4:
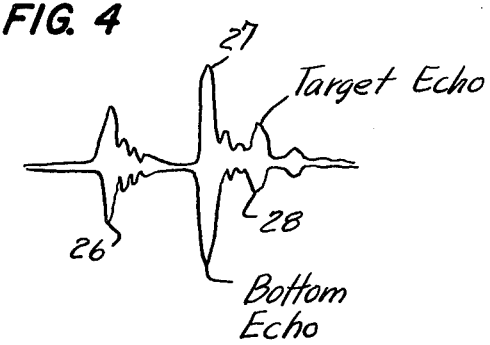
FIG. 4 is a showing of the received signal of one of the narrow beams of FIG. 3.

As seen in FIG. 4, following the volume reverberation signal 26, a sharp bottom echo signal 27 is received. The decay of the bottom signal 27 is seen to be quite abrupt due to the narrow angle of the pencil beam. The target echo signal 28 is easily visible since it is free of the bottom signal.

From the foregoing discussion, the superiority of the narrow beam configuration in providing improved directional discrimination with reduced bottom reverberation and noise becomes apparent. Narrow beams also provide a better angular resolution capability. Prior art systems designed to provide sonic detection over a large area usually accomplish, to a limited extent, these advantages by using the FIG. 1 wide vertical beam patterns thereby achieving resolution by the propagation of a short duration pulse over the search range or using a wide beam projector and narrow beam hydrophones which are mechanically or electrically scanned.

This alternate construction, which may be viewed as a hybrid of FIGS. 1 and 3, employs a multiplicity of preformed narrow hydrophone beams coupled with a broad projector beam to sonify the area of interest is present state-of-the-art for high resolution, high information rate sonar systems. In many applications, the desired narrow beam is difficult to achieve due to physical and operational limitations that constrain the sonar system (transducer size, high-frequency attenuation, etc.). In addition, reduction of side lobe levels is necessary in many systems and is usually accomplished by transducer "shading", i.e., tapering the electrical response of the transducer from a maximum at the center of the transducer to a minimum response at the points on the transducer furtherest from its center. This technique has proved feasible for a multibeam sonar system, but generates a great deal of additional complexity in the system and produces side lobe level reductions at the expense of a broadened beam pattern.

When the above prior art device encounters objects buried below the sea bottom a detection problem occurs which is a result of the poor acoustic propagation properties of the bottom and the design of the prior art system. The receiving transducers, i.e., the hydrophones have side lobes symmetrical to the main beams. Although these side lobes are less sensitive than the main lobe, the high level returns from the bottom are often sufficiently large to produce an off-axis return at the same time that the return from a buried object is present, again masking the desired return.

The device of this invention reduces the effect of the above discussed side lobe detection problem by using a reversible transducer having a "squared" directivity pattern. The directivity pattern for a system is the composite pattern obtained from multiplying corresponding points of the pattern of the insonifying transducer with that of the receiving transducer. In the case of a reversible transducer the corresponding points are identical, the most desirable condition, hence the name squared.

Figure 5:
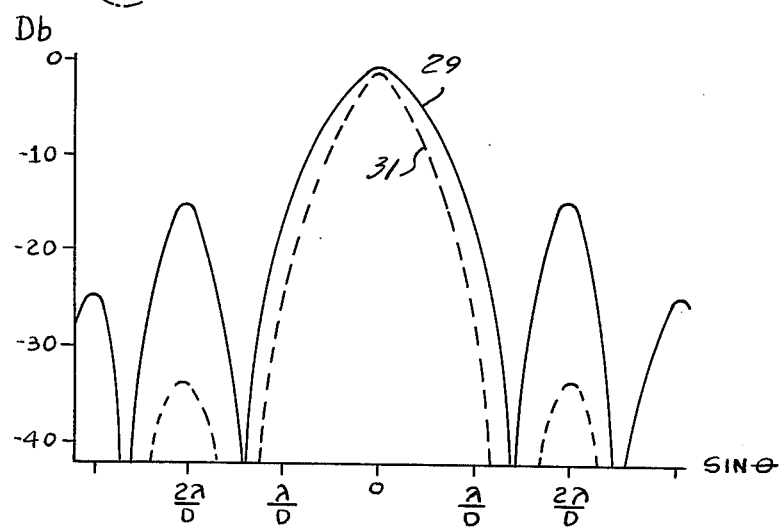
FIG. 5 is a graphic plot of the gain vs. angle off axis of a single transducer element of the type employed by this device.

The advantages of utilizing reversible type transducers is clarified by considering FIG. 5, where the response pattern of a single transducer operating at an optimum frequency is shown as a plot of gain relative to on-axis operation versus angular deviation therefrom. Curve 29 illustrates a typical response for the transducer element operating in a single function as either a transmitter or receiver. It will be observed that the side lobes of curve 29 are down about 15 decibels. The width of the main lobe and the position of the side-lobe are determined by the acoustic wavelength $\lambda$ and the lens aperture width D. If the transducer is operated as a reversible element, that is to receive as well as transmit the acoustic energy, the side lobes are depressed still further due to the composite effect of the two responsive curves, as shown by curve 31. The combined response curve is also seen to have the peaks thereof sharpened, that is, reduced somewhat in angular extent, in comparison to a one way curve as shown at 29.

Figure 6:
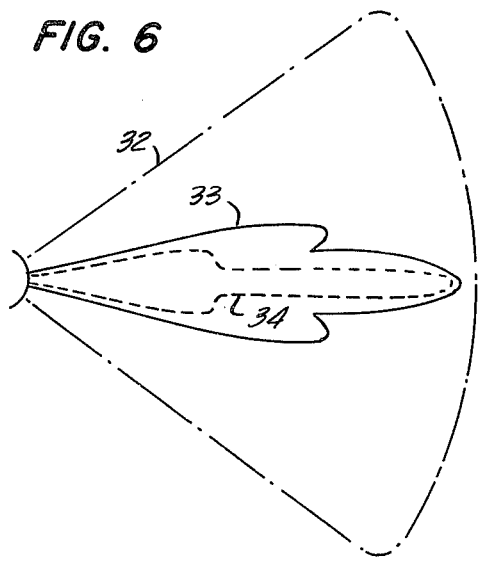
FIG. 6 is a representation of the radiation pattern of the device of the invention showing the contribution of a single transducer element.

A graphic showing of the three types of aforementioned acoustic beams appears in FIG. 6. The broad directivity curve 32 is characteristic of a system having a single projector or all projectors at the same frequency. The side lobed curve 33 is typical of the one way response of a hydrophone of the type used in the above discussed hybrid system and is the best pattern that can be obtained using broad beamwidth insonification. Curve 34 shows the improved directivity pattern characteristic of the reversible transducer employed in the device of the invention.

Reversible transducers exhibiting the squared response directivity pattern have been used before in sonar systems. The system of this invention departs from the prior art by employing a plurality of these transducers which are so arranged in a unified system that their patterns are combined in a cooperative fashion to provide a coverage of a conventional side-looking sonar without loss of the improved angular resolution and improved response associated with this type transducer. This effective utilization is made possible by the employment of a unique transducer arrangement and associated electronic scanning and driving circuits in a manner to now be described.

Figure 7:
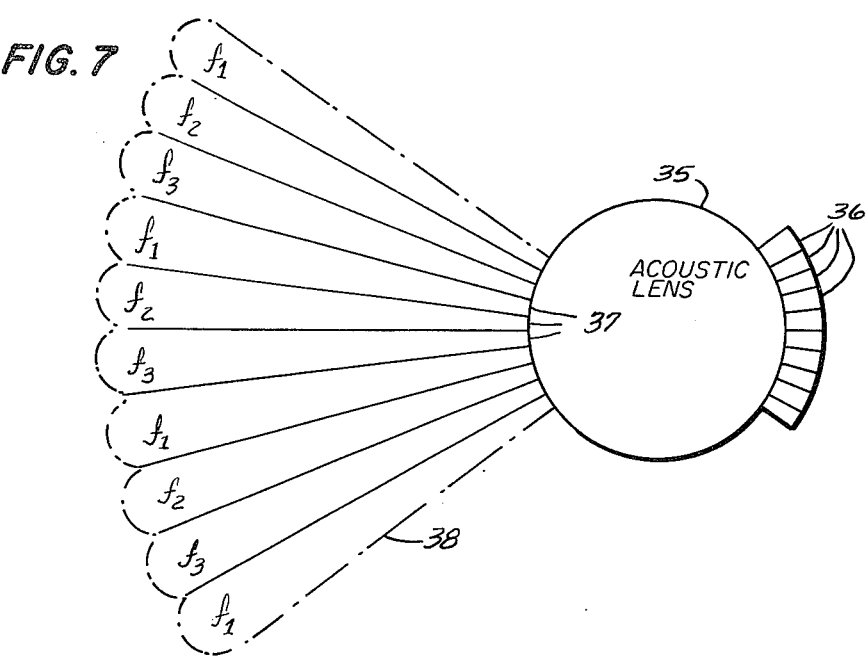
FIG. 7 is a diagrammatic showing of the transducer arrangement according to the invention.

The transducer arrangement permitting the improved operation of the system of the invention is shown at FIG. 7. A suitable refractive directing element, for example, a fluid-filled acoustic lens 35, has a plurality of reversible electroacoustic transducers 36 cooperatively mounted in a retinal configuration on one surface thereof. The individual electroacoustical transducers 36 may be current state-of-the-art units, including shaded elements, which are suitable for the purpose. Because of the compressional nature of the acoustical energy waves, the action of the acoustic lens 35 is unaffected by the frequency of the transducers 36. This permits an improved angular resolution to be obtained by employing different frequencies for adjacent transducers 36 thereby realizing multiple individual squared directivity patterns. The individual acoustic projections 37 of the several transducer elements 36 make up a search pattern 38 comprised by a plurality of individual pencil beams of alternating frequencies. In the embodiment herein described, three frequencies suffice for explanation, but the actual number may be greater depending upon the physical dimensions of lens 35, and the size and directivity of the individual transducer elements 36. Since the transducers 36 are contiguously placed along the rear surface of lens 35, the number of distinct resonant frequencies is chosen to prevent the first side lobes generated by transducers of the same frequency from overlapping.

The radiation pattern resulting from this construction, a broad, fan-shaped pattern comprised of discrete pencils of transmitted signals and returned echoes, permit a resolution which is materially improved over sonar systems of the prior art. The individual transducer elements 36 are pulsed in the transmit function simultaneously and are scanned electronically between pulses to produce a display of echo signals from objects within the sonified pattern 38 reflecting acoustic energy. Two systems, differing primarily in readout devices, have been devised to utilize this unique transducer-lens array and associated radiation pattern.

Figure 8:
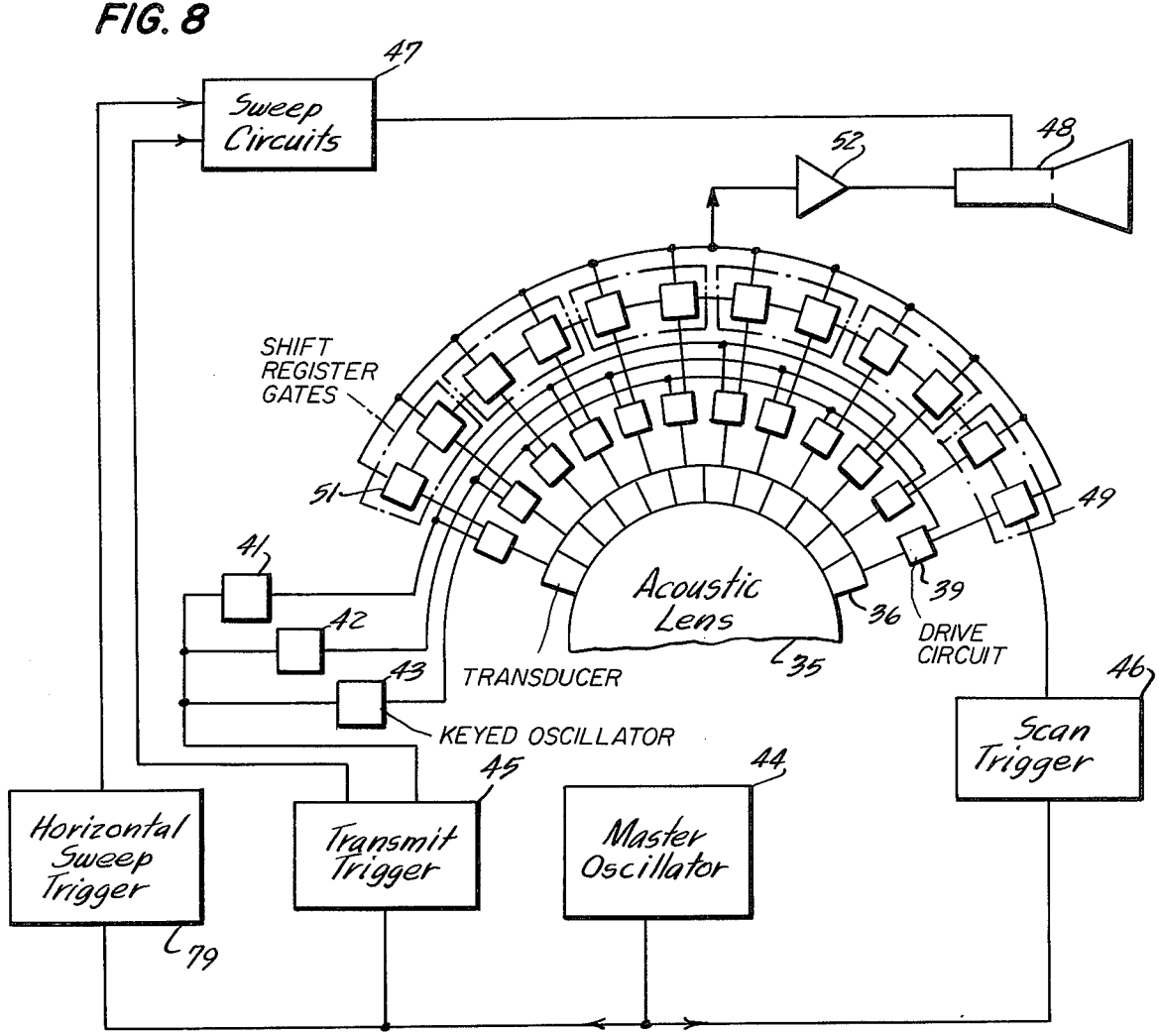
FIG. 8 is a block diagram of a preferred form of the invention.
Figure 10:
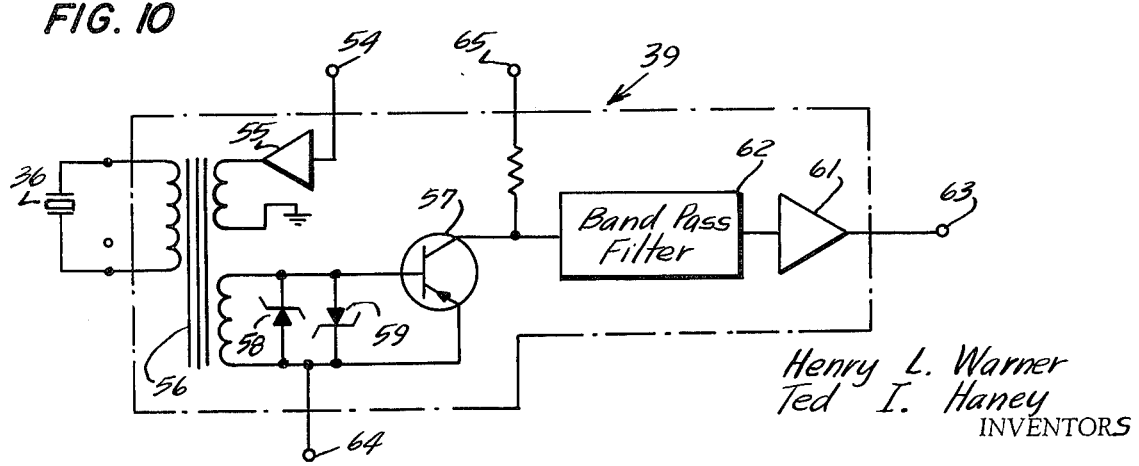
FIGS. 10 and 11 are schematic representations of circuit configurations of the invention.

FIG. 8 shows one of the aforementioned systems, and referring thereto, it is observed that each of transducer elements 36 is connected to a separate driver circuit, shown at 39. The driver circuits 39 couple the outputs of pulse oscillators 41, 42, and 43 to the individual transducer element 36, during transmission, and amplify and feed the electrical pulses according to received signals to the display portion of the system, during receiving functions. The precise circuit configuration of driver circuits 39 is shown in FIG. 10 to be subsequently described. A master oscillator 44 produces an output having a frequency, or repetition rate, related to the number of individual transducer elements 36 and the electronic scan frequency of the system. The electronic scan frequency is usually chosen to be the reciprocal of the transmitted pulse duration. The aforesaid master oscillator output is coupled directly to a scan circuit 46 and through appropriate countdown circuits to a transmit trigger circuit 45 and to the horizontal display sweep circuit 47. Sweep circuits 47, which are not critical in specific circuit configuration and may be any of several known types, provide the appropriate signals to cathode ray display device 48. Trigger circuits 45 and 79 are countdown or successive divide-by-two devices which divide the master oscillator 44 frequency by appropriate amounts to trigger the transmitted pulses and the successive display sweeps. Typical values may be 400 kc/s for master oscillator 44 which would directly trigger the electronically scanned gates 49 200 thousand times per second. Circuit 79 would divide by 100 thereby generating a horizontal sweep trigger for the display every 0.5 ms. Counter 45 would divide by 40 thousand which would trigger the transmit oscillators 41, 42, and 43 and the vertical sweep circuit every 0.2 seconds. The scan trigger circuit 46 is likewise a pulse shaping circuit which triggers shift registergating circuit 49, individual channels of which are represented by blocks 51, to be presently described. Upon proper initiation, the gating circuits 49 pass the output of driver circuit 39 and its associated transducer element 36 to an amplifier means 52 and thence to cathode ray device 48.

Prior to considering the specific configuration of circuits 39 and 49, an alternative arrangement, illustrated at FIG. 9, of the system of the invention will be described. It will be observed that this alternative circuit arrangement employs many of the circuit elements of the arrangement of FIG. 8. Acoustic lens 35, transducer elements 36, driver circuits 39, oscillators 41, 42, and 43, master oscillator 44, and trigger circuits 45 and 46 are present in both system arrangement and cooperate in the same manner in either. In the arrangement of FIG. 9 an electro-illuminescent display device 53 replaces the cathode ray device 48 of the arrangement of FIG. 8. Because the electroilluminescent display device 53 requires no synchronized sweep circuits and, therefore, the output from the transducer circuits may be applied to the column inputs continuously, the shift register-gate channel 49 gates the row inputs to display device 53 providing a time sweep of the sonified investigation area having a duration equal to $2r/c$, where $r$ is the search range and $c$ is the velocity of sound. It should be understood the number of rows and columns of display device 53 used in practice are considerably greater than the eight by twelve shown for purposes of illustration.

Referring to FIG. 10, there is shown a schematic representation of the transducer drive circuit 39. The input driving signal from one of oscillators 41, 42, or 43, depending upon the frequency desired, is fed to terminal 54. A suitable amplifier 55 increases the signals power level to permit driving the appropriate transducer element 36, via tuned transformer 56, to produce a burst of acoustic energy.

Echo returns of the acoustic energy pulse impinge upon transducer element 36 and are coupled, via transformer 56, to a transistor preamplifier 57. Diodes 58 and 59 are arranged to prevent overload of transistor preamplifier 57 by the pulse output of amplifier 55. The amplified echo signal passes from the preamplifier 57 to an automatic gain controlled amplifier 61 through a band pass filter 62. As previously noted, the output of circuit 39, taken from terminal 63, is fed to video amplifier means 52 through gating circuits 49. Terminals 64 and 65 supply necessary operating voltages to the circuit. These voltage and power circuits, and those for other circuits described in detail herein, are not shown in the schematic circuit showings since they are considered state-of-the-art devices and are obvious to the proficient electronic artisan.

Figure 11:
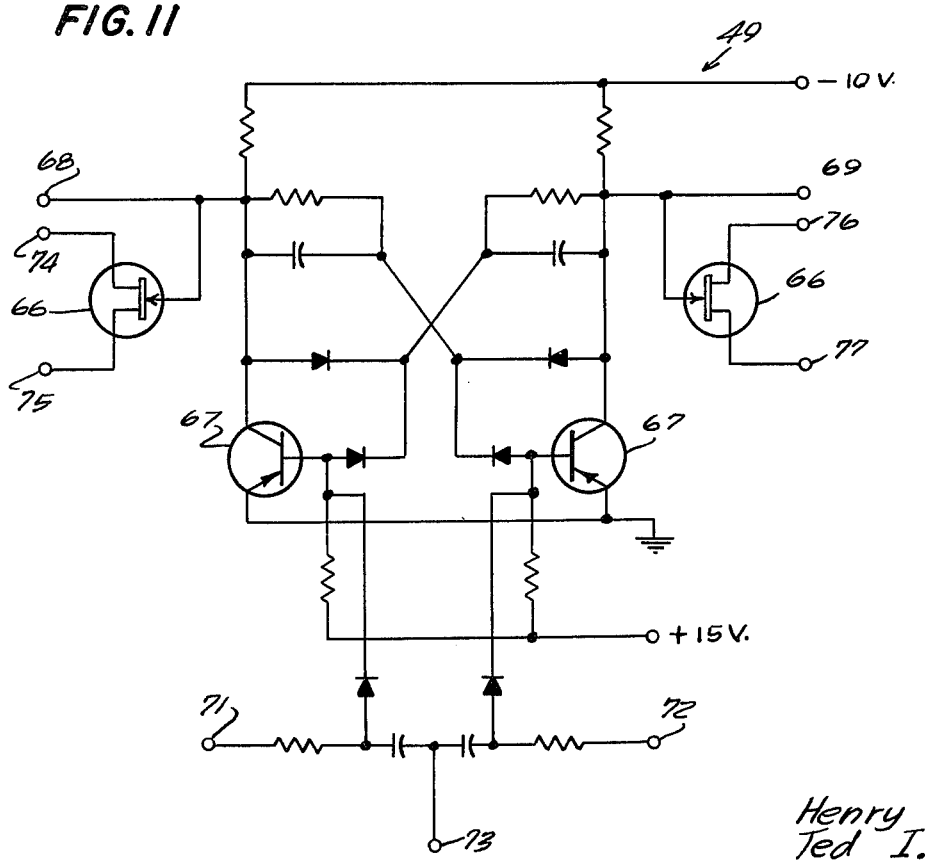

FIG. 11 depicts the basic circuit diagram of the gating circuit 49. This circuit develops the incremential, time-related signal pulses used in the cathode ray configuration of FIG. 8 or gates the fixed voltage to the electro-illuminescent panel display of the FIG. 9 configuration. However, for purposes of brevity, only the specific cooperation with the configuration of FIG. 8 will be described. The gating action is accomplished by a suitable solid state device 66, which may be a field effect device, if desired. The solid state device 66 is turned off and on, i.e. gated, in response to the conductive state of a second solid state device 67. Pairs of solid state devices 67 are connected in a familiar non-saturating multivibrator circuit. The multivibrator has outputs at terminals 58 and 59 in response to a gating signal at terminals 71 and 72 plus a trigger pulse at terminal 73. The output signals, in addition to appearing at terminals 68 and 69, are coupled to the solid state devices 66 to produce, during conduction, a circuit path between terminals 74 and 75 or 76 and 77. It is seen, therefore, that circuit 49 comprises two of the gating channels 51 shown diagrammatically in FIG. 8. Precise values for the elements shown in the conventional configuration of FIG. 11 may be satisfactorily calculated by following conventional design practice as outlined at pages 191–195 in G.E. TRANSISTOR MANUAL, Seventh Edition, General Electric Company, Syracuse, New York, 1964.

Figure 12:
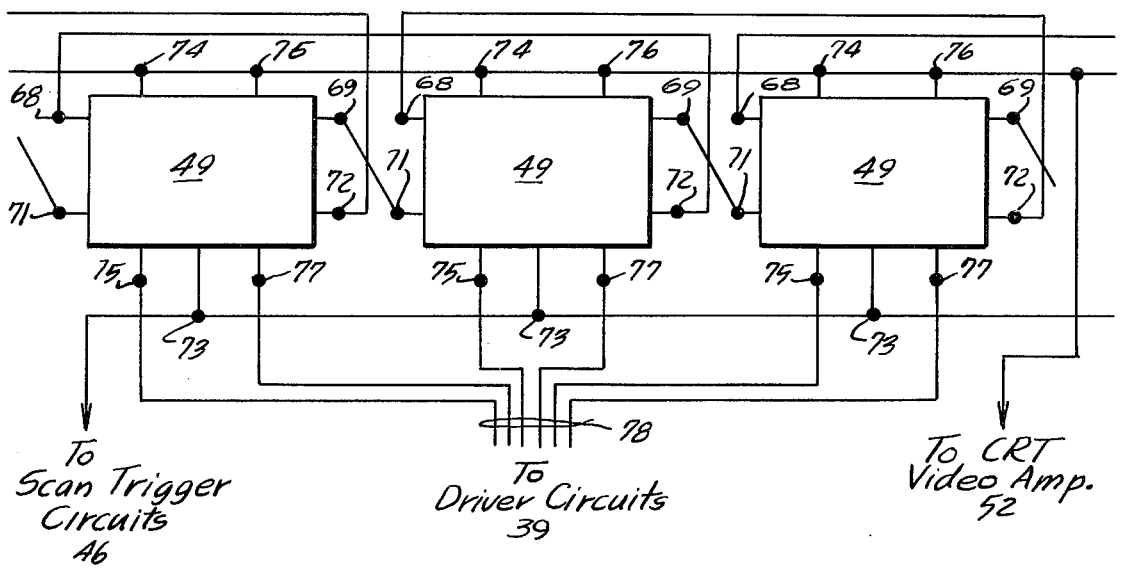
FIG. 12 illustrates schematically how plural circuits of FIG. 11 cooperate in the device of FIG. 8.

A plurality of gating circuits 49 are interconnected, as illustrated in FIG. 12, in a shift register configuration. In such a configuration output terminals 68 and 69 are connected to gate terminals 72 and 71, respectively. The trigger input terminals are joined together and connected to trigger circuit 46 which, as previously noted, generates the signals to advance the shift register to the next conduction state. The input terminals 75 and 77 of each gating circuit 49 are connected to their corresponding driver circuits 39, and thence to the corresponding transducer elements 36 via appropriate multiwired cable 78. The gated output terminals 74 and 76 of the various circuits 49 are joined and connected to video amplifier 52.

To briefly review the operation of the system of the invention, master oscillator 44 produces a series of accurately timed pulses which are fed to a transmitter trigger circuit 45, a scan trigger circuit 46, and sweep trigger circuit 79. In response to the receipt of a predetermined number of pulses or cycles of master oscillator 44, transmit trigger circuit 45 provides output signals to sweep circuit 47 and the oscillators 41, 42, and 43. Each oscillator drives a portion of the transducer elements 36 through a number of driver circuits 39, one for each transducer element 36, with a pulse of electrical energy of the appropriate frequency for generating acoustic ranging signals.

Each transducer 36, in response to the burst of electrical energy from its associated driver circuit 39, produces a pulse of acoustic energy. These several simultaneous bursts of acoustic energy are directed, due to the action of acoustic lens 35, in such a fashion as to establish the desired radiation or ranging search pattern. When the bursts of acoustic energy impinge a solid object, an echo signal is returned, i.e. retro-reflected, to the originating transducer element via acoustic lens 35.

In response to the returned signal, a signal voltage is developed by transducer 36 and is fed, via driver circuit 39 and gating channel 51, to a video amplifier 52 and thereby to a cathode ray display tube 48. The synchronism of the sweep and gating action, assured by mutual dependence on master oscillator 44, provides a visual display on cathode ray tube 48 of signals representing the distribution of echo-returning solid objects within the sonified search radiation pattern.

In the embodiment employing an electro-illuminescent display device, the echo signal output is taken from driver circuit 39 and applied directly to the several column inputs of the display panel 53. The gating channels in the shift register configuration are connected to sequentially apply an operating potential to the row inputs of the panel. The frequency of the signals operating the shift register varies considerably between the two types of display devices. In the cathode ray tube display, a complete sweep of the several channels occupies, preferably, a time only as long as the duration of a transmitted pulse, while in the case of an electro-illuminescent panel display, the sweep of all row inputs occupies the time between transmitted pulses. Except for this difference in the output frequencies of scan trigger circuit, the major circuits shared by the two systems function in the same fashion for each.

While the device has been described as a downward-looking, ship-mounted sonar, the device lends itself to other mounting arrangements. For example, the device may be mounted in a bottom following towed vehicle or on a stationary support within a harbor or waterway. Likewise, the composite investigative beam may be directed outwardly rather than downwardly for detection of swimmers or marine life. The salient features of the herein disclosed invention, i.e. the incorporation of an acoustic lens derived acoustical energy beam comprised by a plurality of discrete pencil beams of different frequencies, the employment of a plurality or reversible electroacoustic transducers to derive said beam, and an electronic scanning system for said transducers, make the invention useful in a wide variety of applications.

Obviously, other embodiments and modifications of the subject invention will readily come to the mind of one skilled in the art having the benefit of the teachings presented in the foregoing description and the drawings.

What is claimed is:

1. An echo-search-ranging system comprising:

a plurality of reversible, piezoelectric transducer elements mounted in a contiguous orientation with respect to one another, each of said transducer elements constructed to radiate and receive compressional wave energy at a one of three predetermined frequencies and different from the frequencies of the transducer elements adjacent thereto;

a refractive fluid filled acoustic lens located in contiguous relationship with said plurality of transducer elements in such a manner as to direct compressional wave energy from and returned reflections to said reversible transducer elements, thereby creating a composite volume of predetermined shape comprised of individual volumes associated with each of said transducer elements;

a plurality of three winding electrical inductors corresponding in number to said plurality of reversible transducing elements and having a first winding of each thereof connected to one of said transducer elements for conducting electrical signals thereto and therefrom;

first electrical oscillator means having a first of said three predetermined frequencies electrically joined to the second windings of the aforesaid three winding electrical inductors connected to transducer elements of said first frequency for timely supplying a burst of electrical energy of said first frequency thereto for transmission thereby to the aforesaid transducer element connected to said first winding thereof;

second electrical oscillator means having a second frequency of said three predetermined frequencies electrically joined to the second windings of the aforesaid three winding electrical inductors connected to transducer elements of said second frequency for timely supplying a burst of electrical energy of said second frequqency thereto for transmission thereby to the aforesaid transducer element connected to said first winding thereof;

third electrical oscillator means having a third frequency electrically joined to the second winding of the remaining ones of the aforesaid three winding electrical inductors which are connected to transducer elements of said third frequency for timely supplying a burst of electrical energy of said third frequency thereto for transmission thereby to the aforesaid transducer element connected to said first winding thereof;

a display circuit having a plurality of input channels corresponding in number to said three winding inductors and electrically joined to said third windings thereof for displaying echo signals from said transducer elements; and an electrical timing circuit electrically joined to said display circuit and said first, second, and third oscillator means for establishing a time relationship therebetween.

2. An echo-search-ranging system according to claim 1 in which said display circuits comprises a cathode ray display device.

3. An echo-search-ranging system according to claim 1 wherein said display device comprises an electroluminescent display device.

4. An echo-search-ranging system according to claim 1 wherein said reversible transducer means are shaded to modify their directivity response.

* * * * *